United States Patent
Kayatani

(10) Patent No.: US 7,570,477 B2
(45) Date of Patent: Aug. 4, 2009

(54) CERAMIC ELECTRONIC COMPONENT AND METHOD FOR MANUFACTURING THE SAME

(75) Inventor: Takayuki Kayatani, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/261,144

(22) Filed: Oct. 30, 2008

(65) Prior Publication Data

US 2009/0040688 A1 Feb. 12, 2009

Related U.S. Application Data

(63) Continuation of application No. PCT/JP2007/058487, filed on Apr. 19, 2007.

(30) Foreign Application Priority Data

Jun. 28, 2006 (JP) ............... 2006-177479

(51) Int. Cl.
H01G 4/228 (2006.01)
H01G 2/20 (2006.01)
H01G 4/248 (2006.01)
H01G 4/06 (2006.01)

(52) U.S. Cl. .............. 361/306.3; 361/321.2; 361/308.1; 361/310

(58) Field of Classification Search ............... 361/306.3, 361/306.2, 306.1, 308.1, 309, 310, 301.4, 361/301.2, 301.1, 308.2, 321.2, 321.3
See application file for complete search history.

(56) References Cited

U.S. PATENT DOCUMENTS

2006/0191443 A1 8/2006 Yamaguchi et al.

FOREIGN PATENT DOCUMENTS

| JP | 06096986 A | * | 4/1994 |
| JP | 10-284343 A |   | 10/1998 |
| JP | 11-219849 A |   | 8/1999 |
| JP | 2003318059 A | * | 11/2003 |

OTHER PUBLICATIONS

Official Communication issued in International Patent Application No. PCT/JP2007/058487, mailed on Jul. 24, 2007.

* cited by examiner

Primary Examiner—Eric Thomas
Assistant Examiner—David M Sinclair
(74) Attorney, Agent, or Firm—Keating & Bennett, LLP

(57) ABSTRACT

In a ceramic electronic component, an electrically conductive resin layer is arranged to cover a thick film layer and to extend beyond the end of the thick film layer by at least about 100 μm and a plating layer is arranged to cover the electrically conductive resin layer except a region having a dimension of at least about 50 μm and extending along the end of the electrically conductive resin layer. Consequently, the concentration of the stress is reduced.

3 Claims, 2 Drawing Sheets

CERAMIC ELECTRONIC COMPONENT AND METHOD FOR MANUFACTURING THE SAME

BACKGROUND OF THE INVENTION

1. Field of the Invention

The present invention relates to a ceramic electronic component and a method for manufacturing the same. In particular, the present invention relates to the structure of a terminal electrode included in a ceramic electronic component and a method for manufacturing the same.

2. Description of the Related Art

Examples of known ceramic electronic components include laminated ceramic electronic components, e.g., laminated ceramic capacitors. FIG. 3 is a sectional view showing a conventional laminated ceramic capacitor 1.

The laminated ceramic capacitor 1 includes an electronic component main body 2 made of ceramic. The electronic component main body 2 has two opposed end surfaces 3 and 4 and a side surface 5 extending between the end surfaces 3 and 4. The electronic component main body 2 includes a plurality of laminated dielectric ceramic layers 6 and internal electrodes 7 and 8 disposed along interfaces between the dielectric ceramic layers 6.

Furthermore, the laminated ceramic capacitor 1 includes terminal electrodes 9 and 10 arranged so as to cover the end surfaces 3 and 4, respectively, of the electronic component main body 2 and extend to a portion of the side surface 5 from each of the end surfaces 3 and 4. The internal electrodes 7 are electrically connected to one terminal electrode 9, and the internal electrodes 8 are electrically connected to the other terminal electrode 10. The internal electrodes 7 and the internal electrodes 8 are alternately arranged in the lamination direction.

The terminal electrodes 9 and 10 are not shown in detail in FIG. 3. However, typically, the terminal electrodes 9 and 10 include thick film layers formed by applying an electrically conductive metal paste to predetermined regions of the surfaces of the electronic component main body 2, followed by baking and plating layers formed by subjecting the thick film layers to a plating treatment.

In use, as shown in FIG. 3, the laminated ceramic capacitor 1 is mounted on a wiring substrate 11. More specifically, solder fillets 14 and 15 are formed by soldering on electrically conductive lands 12 and 13 disposed on the wiring substrate 11, and the terminal electrodes 9 and 10 are electrically connected through the solder fillets 14 and 15, respectively.

During the formation of the thick film layers of the terminal electrodes 9 and 10, since a glass component included in the electrically conductive metal paste used to form the thick film layers reacts with the ceramic on the electronic component main body 2 side, a fragile reaction layer is formed at the interface between the thick film layer and the electronic component main body 2. Consequently, if a relatively large stress is applied to the thick film layer, cracking may start at an end of the thick film layer in the electronic component main body 2. For example, if a stress caused by bending of the wiring substrate 11 is applied while the laminated ceramic capacitor 1 is mounted on the wiring substrate 11, as shown in FIG. 3, a crack may start at an end of the thick film layer toward the internal electrode 7 or 8. In some cases, a crack extends to the internal electrode 7 or 8 and, thereby, a short-circuit failure of the laminated ceramic capacitor 1 may occur.

To overcome these problems, an electrically conductive resin layer has been interposed between the thick film layer and the plating layer included in the terminal electrode (see, for example, Japanese Patent No. 3363369 and Japanese Unexamined Patent Application Publication No. 10-284343). According to the technology described in Japanese Patent No. 3363369 and Japanese Unexamined Patent Application Publication No. 10-284343, a stress from outside is absorbed by deformation of the electrically conductive resin layer, and thereby, cracking in the electronic component main body is prevented. In addition, when an excessive stress exceeds an acceptable range, peeling is likely to occur at the interface between the thick film layer and/or the plating layer and the electrically conductive resin layer, and thereby, the stress is reduced so as to prevent cracking in the electronic component main body.

In the terminal electrode having the above-described structure, when a stress that is greater than or equal to a predetermined value is applied, this stress is reduced by the interlayer peeling in the terminal electrode. Therefore, the bonding force at the interface in which such interlayer peeling is designed to occur is set at a relatively low value. Consequently, there is a problem in that the end of the terminal electrode is vulnerable to a tensile stress.

More specifically, when a plating layer is formed, a laminated ceramic capacitor is transported during production, or a laminated ceramic capacitor is mounted on a wiring substrate by soldering, the plating layer disposed on the electrically conductive resin layer applies a tensile stress to the electrically conductive resin layer, and this stress concentrates at an end of the plating layer, that is, the end of the electrically conductive resin layer. Consequently, the electrically conductive resin layer may be peeled at the end thereof. If the electrically conductive resin layer is peeled during mounting of the laminated ceramic capacitor, as described above, when a large stress is applied to the laminated ceramic capacitor afterward, the electrically conductive resin layer may not be able to provide sufficient stress reduction. As a result, cracking may occur in the laminated ceramic capacitor, and short-circuit failure may occur.

SUMMARY OF THE INVENTION

To overcome the problems described above, preferred embodiments of the present invention provide a ceramic electronic component including an electronic component main body, which is made of ceramic and which has two opposed end surfaces and a side surface extending between the opposed end surfaces, and terminal electrodes arranged to cover each of the end surfaces of the electronic component main body and to extend to a portion of the side surface from each of the end surfaces.

In the ceramic electronic component according to preferred embodiments of the present invention, the terminal electrode includes a thick film layer which is a thick film made of a baked electrically conductive metal, an electrically conductive resin layer including a thermosetting resin and electrically conductive fillers, and a plating layer made of an electrically conductive metal plated film. The thick film layer is disposed on each of the end surfaces and a portion of the side surface of the electronic component main body. The electrically conductive resin layer is preferably arranged to cover the thick film layer and extend beyond the end of the thick film layer by at least about 100 μm on the side surface, for example. The electrically conductive resin layer includes a region that contains substantially no filler at an end of the portion located on the side surface. The plating layer is preferably arranged to cover the electrically conductive resin layer except in a region having a dimension of at least about 50 μm, for example, and extending along the end of the electrically conductive resin layer.

Preferably, the electrically conductive resin layer has a bonding force within the range of about 0.3 N/mm² to about 10 N/mm², for example, with respect to the electronic component main body.

In a preferred embodiment of the present invention, a phenol resin is preferably used as the thermosetting resin included in the electrically conductive resin layer and a silver-coated copper powder is preferably used as the electrically conductive filler included in the electrically conductive resin layer, for example.

Preferred embodiments of the present invention are also directed to a method for manufacturing a ceramic electronic component having the above-described configuration.

The method for manufacturing a ceramic electronic component according to preferred embodiments of the present invention includes the steps of preparing an electronic component main body which is made of ceramic and which includes two opposed end surfaces and a side surface extending between the opposed end surface and forming terminal electrodes to cover each of the end surfaces of the electronic component main body and to extend to a portion of the side surface from each of the end surfaces.

In the step of forming terminal electrodes, the step of applying an electrically conductive metal paste to each of the end surfaces and a portion of the side surface of the electronic component main body and baking the electrically conductive metal paste so as to form a thick film layer is performed first. Thereafter, the step of applying an electrically conductive resin paste is performed, followed by drying and heat-curing, wherein the electrically conductive resin paste preferably having a thixotropic property to exhibit a viscosity of about 200 Pa·s or less at a shear rate of about 0.1 s$^{-1}$ and including a thermosetting resin and electrically conductive fillers is applied so as to cover the above-described thick film layer and preferably extends beyond the end of the thick film layer by at least about 100 μm, for example, on the side surface, followed by drying and heat-curing, so as to form an electrically conductive resin layer. Subsequently, the step of forming an electrically conductive metal plating film on the electrically conductive resin layer by electroplating so as to form a plating layer is performed.

In the method for manufacturing a ceramic electronic component according to preferred embodiments of the present invention, preferably, a paste having a bonding force within the range of about 0.3 N/mm² to about 10 N/mm², for example, after curing with respect to the electronic component main body is used as the electrically conductive resin paste to form the electrically conductive resin layer.

The end of the electrically conductive resin layer defining an intermediate layer is preferably located at a location beyond the end of the thick film layer by at least about 100 μm, for example, and the end of the surface plating layer is preferably located at a location spaced back from the end of the electrically conductive resin layer by at least about 50 μm, for example.

Consequently, the electrically conductive resin layer covers the electronic component main body in a region having a dimension of at least about 100 μm beyond the end of the thick film layer, and the concentration of the stress on the end of the thick film layer at which cracking often begins can be reduced.

Furthermore, the end of the plating layer is displaced from the end of the electrically conductive resin layer by at least about 50 μm. Therefore, the point at which the stress applied from the plating layer to the electrically conductive resin layer is concentrated is displaced from the end of the electrically conductive resin layer. Consequently, the end of the electrically conductive resin layer is sufficiently displaced from the end of the plating layer at which the stress is concentrated during the formation of the plating layer, during production of the laminated ceramic capacitor and during soldering to the terminal electrode during mounting. Therefore, the occurrence of peeling of the electrically conductive resin layer caused by the stress is prevented.

In a manner similar to those described in Japanese Patent No. 3363369 and Japanese Unexamined Patent Application Publication No. 10-284343, the electrically conductive resin layer absorbs the stress from the outside. If stress from the outside exceeds an acceptable range, the electrically conductive resin layer is peeled. In each case, an occurrence of cracking in the electronic component main body can be prevented, and a serious defect, e.g., burnout or smoking, of the ceramic electronic component can be prevented.

In preferred embodiments of the present invention, if the electrically conductive resin layer has a bonding force in the range of about 0.3 N/mm² to about 10 N/mm² with respect to the electronic component main body, the stress reduction produced by the electrically conductive resin layer can be sufficiently provided.

In preferred embodiments of the present invention, if the silver-coated copper powder is used as the electrically conductive filler included in the electrically conductive resin layer, oxidation of the surface of the electrically conductive resin layer is prevented. In addition, the absolute value of silver is reduced and, thereby, the migration of silver can be reduced. When the phenol resin is used as the thermosetting resin included in the electrically conductive resin layer, a reducing effect can be exerted during heat-curing and, thereby, oxidation of a portion of the surface of the copper powder which is not coated with silver can be prevented.

Regarding the method for manufacturing a ceramic electronic component according to preferred embodiments of the present invention, the electrically conductive resin paste having a thixotropic property to exhibit a viscosity of about 200 Pa·s or less at a shear rate of about 0.1 s$^{-1}$ is used to form the electrically conductive resin layer. Therefore, a region that does not include a substantial amount of the filler can easily be formed at an end of the electrically conductive resin layer after heat-curing.

That is, the shear rate of about 0.1 s$^{-1}$ corresponds to a state in which almost no external force is applied to the electrically conductive resin paste. The viscosity of about 200 Pa·s or less under this condition is a significantly low viscosity, as compared to a paste viscosity that is conventionally used. Since the electrically conductive resin layer is formed using the electrically conductive resin paste having such a low viscosity, when the electrically conductive resin paste is applied so as to cover the thick film layer on the electronic component main body and extend beyond the end of the thick film layer by at least about 100 μm on the side surface, the electrically conductive resin paste tends to spread through wetting toward the central portion between the end surfaces of the electronic component main body. However, the electrically conductive fillers included in the electrically conductive resin paste are in contact with each other, and thereby, a force facilitating the mutual bonding is applied so that the fillers tend to maintain their positions and not spread. As a result, the electrically conductive fillers do not significantly move from the locations in which the fillers are originally applied, and merely a solvent and a resin component dissolved therein spread through wetting. Consequently, a region that does not substantially include the electrically conductive filler can be provided at the end of the electrically conductive resin layer.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

A laminated ceramic capacitor will be described below as an example of a ceramic electronic component according to preferred embodiments of the present invention.

First Preferred Embodiment

Figure 1:
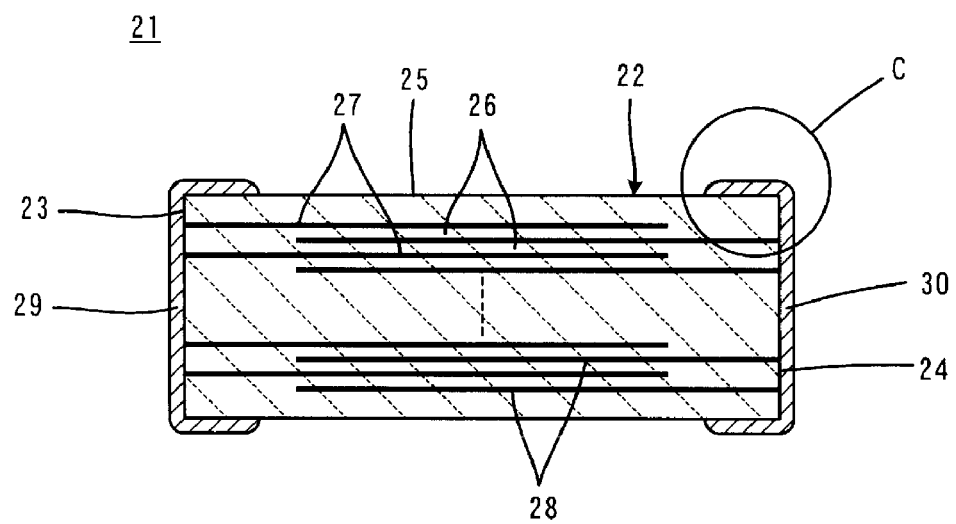
FIG. 1 is a sectional view showing a laminated ceramic capacitor according to a preferred embodiment of the present invention.
Figure 2:
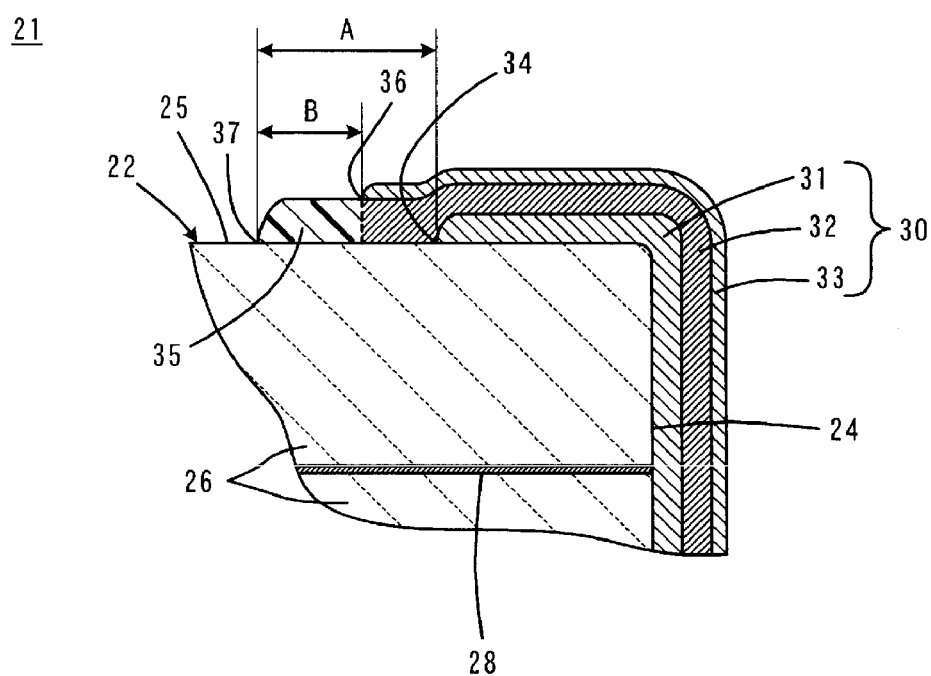
FIG. 2 is a sectional view of a magnified portion shown in FIG. 1.
Figure 3:
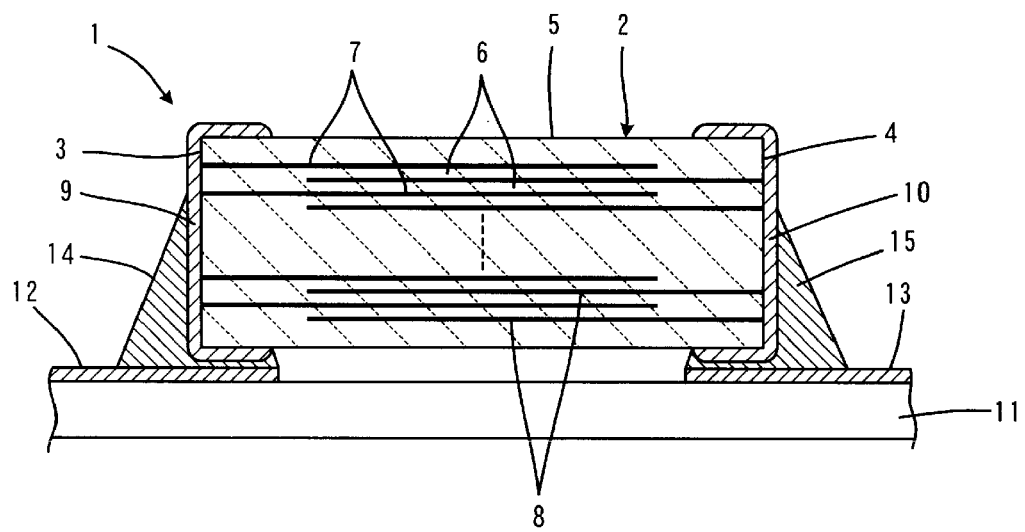
FIG. 3 is a sectional view showing a known laminated ceramic capacitor mounting on a wiring substrate.

FIG. 1 is a sectional view showing a laminated ceramic capacitor 21 according to a preferred embodiment of the present invention. FIG. 2 is a sectional view of a magnified portion C shown in FIG. 1. The laminated ceramic capacitor 21 shown in FIGS. 1 and 2 has substantially the same structure as the structure of the laminated ceramic capacitor 1 shown in FIG. 3 except for the structure of the terminal electrode.

The laminated ceramic capacitor 21 includes an electronic component main body 22 made of ceramic. The electronic component main body 22 includes two end opposed surfaces 23 and 24 and a side surface 25 extending between the opposed end surfaces 23 and 24. Furthermore, the electronic component main body 22 includes a plurality of laminated dielectric ceramic layers 26 and internal electrodes 27 and 28 disposed along specific interfaces between the dielectric ceramic layers 26.

The laminated ceramic capacitor 21 includes terminal electrodes 29 and 30 arranged to cover the end surfaces 23 and 24, respectively, of the electronic component main body 22 and extend to a portion of the side surface 25 from each of the end surfaces 23 and 24, respectively. The internal electrodes 27 are electrically connected to one terminal electrode 29, and the internal electrodes 28 are electrically connected to the other terminal electrode 30. The internal electrodes 27 and internal electrodes 28 are alternately disposed in the lamination direction.

In the above-described laminated ceramic capacitor 21, the terminal electrodes 29 and 30 have a characteristic structure. FIG. 2 shows a portion of one terminal electrode 30 under magnification. Since the terminal electrode 30 shown in FIG. 2 and the terminal electrode 29 have substantially the same structure, the terminal electrode 30 will be described below in detail.

As shown in FIG. 2, the terminal electrode 30 includes a thick film layer 31 defined by a baked thick film of an electrically conductive metal, an electrically conductive resin layer 32 including a thermosetting resin and electrically conductive fillers, and a plating layer 33 defined by an electrically conductive metal plating film.

Examples of electrically conductive metals used for the thick film layer 31 preferably include copper. Examples of thermosetting resins included in the electrically conductive resin layer 32 preferably include phenol resins, e.g., a resol type phenol resin. Examples of electrically conductive fillers included in the electrically conductive resin layer 32 preferably include a silver-coated copper powder. In many cases, the plating layer 33, although not shown in FIG. 2, preferably includes a plurality of layers, for example, a nickel plating film and a tin plating film disposed thereon.

As described above, if the silver-coated copper powder is used as the electrically conductive filler included in the electrically conductive resin layer 32, oxidation of the surface of the electrically conductive resin layer 32 is prevented. In addition, the absolute value of silver is reduced and, thereby, migration of silver is reduced. When the phenol resin is used as the thermosetting resin included in the electrically conductive resin layer 32, a reducing effect can be provided during heat-curing and, thereby, oxidation of a portion of the surface of the copper powder which is not coated with silver can be prevented.

The thick film layer 31 is disposed on the end surface 24 and a portion of the side surface 25 of the electronic component main body 22.

The electrically conductive resin layer 32 is preferably arranged to cover the above-described thick film layer 31 and extend beyond the end 34 of the thick film layer 31 by a dimension A of at least about 100 μm, for example, on the side surface 25. The electrically conductive resin layer 32 directly covers the electronic component main body 22 in the portion of dimension A. The electrically conductive resin layer 32 includes a filler-free region 35 which does not include a substantial amount of the electrically conductive filler and being disposed at an end portion of the portion located on the side surface 25. In FIG. 2, the boundary between the filler-free region 35 and the other region of the electrically conductive resin layer 32 is indicated by a clear broken line.

The plating layer 33 is preferably arranged to cover the electrically conductive resin layer 32 except in a region having a dimension B of at least about 50 μm, for example, and extending along the end 37 of the electrically conductive resin layer 32. The plating layer 33 is formed by electroplating and, therefore, is not formed on the filler-free region 35, as described later. Consequently, the region having the dimension B and not provided with the plating layer 33 of the electrically conductive resin layer 32 corresponds to the filler-free region 35.

The laminated ceramic capacitor 21 can be produced as described below.

The electronic component main body 22 produced by a known process is prepared. The electrically conductive metal paste is prepared. The electrically conductive metal paste is applied to each of the end surfaces 23 and 24 and a portion of the side surface 25 of the electronic component main body 22, followed by baking. In this manner, the thick film layer 31 is formed.

The electrically conductive resin paste preferably having a thixotropic property to exhibit a viscosity of about 200 Pa·s or less at a shear rate of about $0.1\ s^{-1}$, for example, and including the thermosetting resin and the electrically conductive fillers is prepared. This electrically conductive resin paste is preferably applied so as to cover the above-described thick film layer 31 and extend beyond the end 34 of the thick film layer 31 by at least about 100 μm, for example, on the side surface 25 of the electronic component main body 22, followed by drying and heat-curing. In this manner, the electrically conductive resin layer 32 is formed.

In the above-described step, the applied electrically conductive resin paste itself tends to spread through wetting toward the central portion between end surfaces 23 and 24 of the electronic component main body 22. At this time, the electrically conductive fillers included in the electrically conductive resin paste are in contact with each other and, thereby, a force that facilitates mutual bonding is provided, so that the fillers tend to maintain their location. Consequently, only a solvent in the electrically conductive resin paste and a resin component dissolved therein spread through wetting. As a result, a filler-free region 35 which does not include a substantial amount of the electrically conductive filler is formed at the end portion of the electrically conductive resin layer 32.

Subsequently, the electrically conductive metal plating film is formed on the electrically conductive resin layer 32 by electroplating, so that the plating layer 33 is formed. The plating layer 33 is not formed on the filler-free region 35. In this manner, the dimension B of the filler-free region 35 not provided with the plating layer 33 can be adjusted by changing the viscosity of the electrically conductive resin paste applied to form the electrically conductive resin layer 32. That is, the dimension B of the filler-free region 35 can be increased by reducing the viscosity of the electrically conductive resin paste. If the viscosity of the electrically conductive resin paste is too low, formation of the electrically conductive resin layer 32 having good appearance becomes difficult. Therefore, it is preferable that the viscosity thereof is at least about 20 Pa·s, for example.

In the laminated ceramic capacitor 21, as described above, the plating layer 33 is arranged to cover the electrically conductive resin layer 32 except the region preferably having a dimension B of at least about 50 μm, for example and extending along the end 37 of the electrically conductive resin layer 32, that is, the filler-free region 35. Therefore, the location of the end 36 of the plating layer 33 can be displaced from the end 37 of the electrically conductive resin layer 32 by at least about 50 μm, for example. Consequently, the end 36 on which the stress applied by the plating layer 33 to the electrically conductive resin layer 32 is concentrated during formation of the plating layer 33, during the production of the laminated ceramic capacitor 21, and during soldering to the terminal electrodes 29 and 30 can be displaced from the end 37 of the electrically conductive resin layer 32. Thus, peeling of the electrically conductive resin layer 32 before mounting of the laminated ceramic capacitor 21 is prevented. As a result, when the wiring substrate is bent and an external force exceeding an acceptable range is applied to the laminated ceramic capacitor 21, the stress reduction can be sufficiently provided.

When the above-described dimension B is less than about 50 μm, the end 36 which is the stress concentration portion of the plating layer 33 and the end 37 which is the weakest bonding force portion of the electrically conductive resin layer 32 with respect to the electronic component main body 22 are too close to each other, and the electrically conductive resin layer 32 may be accidentally peeled by the stress applied to the plating layer 33 during soldering, for example. The dimension A of the electrically conductive resin layer 32 extending beyond the end 34 of the thick film layer 32 is preferably at least about 100 μm. If this dimension A is less than about 100 μm, the stress reduction of the electrically conductive resin layer 32 is not sufficiently provided, and therefore, cracking may occur in the electronic component main body 22.

The experimental examples produced to verify the effects of preferred embodiments of the present invention will be described below.

An electronic component main body of about 3.2 mm length, about 1.6 mm width, and about 1.25 mm height for a laminated ceramic capacitor was prepared using a known process. The electronic component main body included internal electrodes including nickel as a primary component and was designed such that the target value of capacitance was about 1,000 pF.

An electrically conductive metal paste including copper as an electrically conductive component was applied to each of the end surfaces, at which internal electrodes were exposed, and a portion of the side surface adjacent thereto of the above-described electronic component main body, followed by baking, so that a thick film layer of a terminal electrode was formed.

An electrically conductive resin paste of each sample shown in Table 1 was prepared. Table 1 shows the material of a powder which is included in the electrically conductive resin paste and which functions as an electrically conductive filler, the type of a thermosetting resin included in the electrically conductive resin paste, the viscosity of the electrically conductive resin paste, and the bonding force provided by the electrically conductive resin paste after curing with respect to the electronic component main body.

A term "Ag-coated Cu" in the column "Electrically conductive filler" represents a silver-coated copper powder. A term "phenol" described in the column "Thermosetting resin" represents a resol type phenol resin.

The viscosity of the electrically conductive resin paste was adjusted by diluting it with a solvent. Regarding the electrically conductive resin paste of each sample, the ratio of addition of the thermosetting resin was adjusted such that the resistivity was $1\times10^{-4}$ Ω·cm or less after curing.

TABLE 1

| Sample No. | Electrically conductive filler | Thermosetting resin | Viscosity [Pa · s] | Bonding force [N/mm$^2$] |
|---|---|---|---|---|
| 1 | Ag | epoxy | 194 | 7.8 |
| 2 | Ag | phenol | 121 | 2.0 |
| 3 | Ag | phenol | 25 | 1.3 |
| 4 | Cu | epoxy | 38 | 6.4 |
| 5 | Cu | phenol | 172 | 1.1 |
| 6 | Cu | phenol | 77 | 0.8 |
| 7 | Ag-coated Cu | epoxy | 56 | 5.7 |
| 8 | Ag-coated Cu | phenol | 168 | 9.8 |
| 9 | Ag-coated Cu | phenol | 93 | 1.5 |
| 10 | Ag-coated Cu | phenol | 22 | 0.3 |
| 11 | Ag | epoxy | 267 | 13.8 |
| 12 | Cu | phenol | 321 | 7.8 |
| 13 | Ag-coated Cu | epoxy | 1020 | 6.4 |
| 14 | Ag-coated Cu | phenol | 865 | 0.3 |
| 15 | Ag-coated Cu | phenol | 762 | 1.5 |
| 16 | Ag-coated Cu | phenol | 585 | 1.5 |
| 17 | Ag-coated Cu | phenol | 183 | 8.3 |

The electrically conductive resin paste of each sample shown in Table 1 was applied to a predetermined region of the electronic component main body provided with the thick film layer, followed by drying and heat-curing, so that an electrically conductive resin layer was formed.

A nickel plating film having a thickness of about 3 μm was formed by electroplating on the electrically conductive resin layer, and a tin plating film having a thickness of about 3 μm was formed thereon, so that a plating layer was formed. The interval of the terminal electrodes including the thick film layer, the electrically conductive resin layer, and the plating layer was at least about 1.5 mm.

For each of the thus obtained samples, the dimensions A and B, as shown in FIG. 2, were measured. The results are shown in Table 2.

TABLE 2

| Sample No. | A [μm] | B [μm] |
|---|---|---|
| 1 | 356 | 52 |
| 2 | 124 | 77 |
| 3 | 588 | 274 |
| 4 | 362 | 145 |
| 5 | 105 | 53 |
| 6 | 226 | 108 |
| 7 | 284 | 159 |
| 8 | 100 | 86 |
| 9 | 248 | 133 |
| 10 | 691 | 502 |
| 11 | 85 | 26 |
| 12 | 37 | 31 |
| 13 | 73 | 0 |
| 14 | 0 | 0 |
| 15 | 5 | 0 |
| 16 | 126 | 35 |
| 17 | 72 | 104 |

For each sample, whether peeling of the electrically conductive resin layer occurred or not was determined after plating to form the above-described plating layer, after reflow soldering, and after flow soldering and, in addition, the occurrence of short-circuit failure in a substrate bending test was evaluated.

For more details with respect to the peeling of the electrically conductive resin layer after plating, 100 test pieces of each sample were evaluated using a stereoscopic microscope to determine whether or not peeling occurred.

With respect to the peeling of the electrically conductive resin layer after reflow soldering, 100 test pieces of each sample were mounted on a glass epoxy substrate, and reflow soldering was performed using Sn—Ag—Cu solder with a profile in which a preheating zone was set to about 150° C. to about 180° C./90 sec and a main heating zone was set to at least about 240° C. (maximum temperature about 260° C.)/60 sec. Thereafter, the evaluation was conducted using a stereoscopic microscope and inspection of the polished surface of a cross-section defined by the dimension in a longitudinal direction and the dimension in a thickness direction of the electronic component main body based on whether or not peeling of the electrically conductive resin layer occurred.

With respect to the peeling of the electrically conductive resin layer after flow soldering, 100 test pieces of each sample were mounted on a glass epoxy substrate, and double wave flow soldering was conducted using molten Sn-3.0 Ag-0.5 Cu solder set to about 260° C. Thereafter, the evaluation was conducted using a stereoscopic microscope and inspection of the polished surface of a cross-section defined by the dimension in a longitudinal direction and the dimension in a thickness direction of the electronic component main body on the basis of whether or not peeling of the electrically conductive resin layer occurred.

With respect to the incidence of short-circuit failure, a copper foil land having a distance between lands of about 2.2 mm, a dimension in the width direction of about 2.0 mm, and a dimension in the longitudinal direction of about 2.8 mm was formed such that the barycenter location was allowed to correspond to that of the glass epoxy substrate of about 100 mm length, about 40 mm width, and about 1.6 mm height. After a solder paste was printed on a test substrate using a metal mask having a thickness of about 150 μm, each sample was mounted and reflow soldering was performed. The test substrate was bent up to a maximum amount of bending of about 6 mm based on the test condition described in JIS C 5102-1994. Subsequently, whether or not short-circuit failure caused by IR shock occurred was observed and the incidence thereof was determined.

The results thereof are shown in Table 3.

TABLE 3

| Sample No. | Peeling of electrically conductive resin layer | | | Incidence of short-circuit failure [%] |
|---|---|---|---|---|
| | After plating | After reflow soldering | After flow soldering | |
| 1 | none | none | none | 0 |
| 2 | none | none | none | 0 |
| 3 | none | none | none | 0 |
| 4 | none | none | none | 0 |
| 5 | none | none | none | 0 |
| 6 | none | none | none | 0 |
| 7 | none | none | none | 0 |
| 8 | none | none | none | 0 |
| 9 | none | none | none | 0 |
| 10 | none | none | none | 0 |
| 11 | none | none | none | 6 |
| 12 | none | none | occurred | 3 |
| 13 | none | occurred | occurred | 5 |
| 14 | occurred | occurred | occurred | 12 |
| 15 | none | occurred | occurred | 10 |
| 16 | none | none | occurred | 2 |
| 17 | none | none | none | 1 |

Samples 1 to 10 satisfy the condition of A≧100 μm and B≧50 μm, as shown in Table 2. Furthermore, in Samples 1 to 10, the electrically conductive resin layers have bonding forces within the range of about 0.3 N/mm² to about 10 N/mm², as shown in Table 1.

Regarding Samples 1 to 10, as shown in Table 3, peeling of the electrically conductive resin layer does not occur after plating, after reflow soldering, and after flow soldering. The reason for this is believed to be that not only the electrically conductive resin layer absorbs the stress, but also the end of the electrically conductive resin layer is displaced from the end of the thick film layer by a dimension of at least about 100 μm, the end of the plating layer is displaced from the end of the electrically conductive resin layer by a dimension of at least about 50 μm, and thereby, the concentration of the stress at which cracking tends to begin is sufficiently reduced.

As shown in Table 3, the incidence of short-circuit failure is 0% for Samples 1 to 10. When a mechanical stress caused by bending of the substrate is applied to the laminated ceramic capacitor, the stress is concentrated on the end of the plating layer on which a solder fillet is formed, and the stress is much larger than the stress produced during the formation of the plating layer or the stress during soldering. However, it is believed that the above-described stress is efficiently reduced by the peeling of the electrically conductive resin layer at the interface to the electronic component main body/the plating layer and, as a result, an occurrence of cracking in the electronic component main body is suppressed.

On the other hand, with respect to Samples 11 to 17 in which A is less than about 100 μm and/or B is less than about 50 μm, peeling of the electrically conductive resin layer occurs or a short-circuit failure occurs. In particular, with respect to Sample 16, A is at least about 100 μm, but B is less than about 50 μm, as shown in Table 2. Consequently, peeling of the electrically conductive resin layer occurs after flow soldering and, in addition, a short-circuit failure occurs, as shown in Table 3. With respect to Sample 17, B is at least about 50 μm, but A is less than about 100 μm, as shown in Table 2. Consequently, a short-circuit failure occurs, as shown in Table 3.

In the above description, preferred embodiments of the present invention have been explained with reference to the laminated ceramic capacitor as an example of the laminated ceramic electronic component. However, preferred embodiments of the present invention can be similarly applied to laminated ceramic electronic components other than the laminated ceramic capacitor or ceramic electronic components not having the laminated structure, that is, having a so-called single layer structure.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A ceramic electronic component comprising:
   an electronic component main body made of ceramic and including two opposed end surfaces and a side surface extending between the opposed end surfaces; and
   terminal electrodes arranged to cover each of the end surfaces of the electronic component main body and to extend to a portion of the side surface from each of the end surfaces; wherein
   the terminal electrode includes:
   a thick film layer defined by a thick film made of a baked electrically conductive metal and disposed on each of the end surfaces and a portion of the side surface of the electronic component main body;
   an electrically conductive resin layer including a thermosetting resin and electrically conductive fillers, arranged to cover the thick film layer and extend beyond an end of the thick film layer by at least about 100 μm on the side surface, and includes a region which substantially does not include the electrically conductive filler at an end portion of the portion located on the side surface; and
   a plating layer defined by an electrically conductive metal plating film and arranged to cover the electrically conductive resin layer except a region having a dimension of at least about 50 μm and extending along the end of the electrically conductive resin layer.

2. The ceramic electronic component according to claim 1, wherein the electrically conductive resin layer has a bonding force within the range of about 0.3 N/mm$^2$ to about 10 N/mm$^2$ with respect to the electronic component main body.

3. The ceramic electronic component according to claim 1, wherein the thermosetting resin included in the electrically conductive resin layer is a phenol resin and the electrically conductive filler included in the electrically conductive resin layer is a silver-coated copper powder.

* * * * *